United States Patent
Vernacchia et al.

(10) Patent No.: US 8,053,691 B2
(45) Date of Patent: Nov. 8, 2011

(54) PARK INHIBITION SOLENOID ASSEMBLY

(75) Inventors: Mark A. Vernacchia, Northville, MI (US); Stephen W. Powell, South Lyon, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 534 days.

(21) Appl. No.: 12/326,561

(22) Filed: Dec. 2, 2008

(65) Prior Publication Data

US 2009/0158877 A1 Jun. 25, 2009

Related U.S. Application Data

(60) Provisional application No. 61/015,690, filed on Dec. 21, 2007.

(51) Int. Cl.
*H01H 3/16* (2006.01)
(52) U.S. Cl. .......... 200/61.91; 200/61.45 M; 200/61.54; 74/473.21; 74/473.25
(58) Field of Classification Search .. 74/473.21–473.25; 200/61.45 M, 61.54, 61.91
See application file for complete search history.

(56) References Cited

U.S. PATENT DOCUMENTS

| 3,840,088 | A | * | 10/1974 | Marumo et al. | ............. 180/282 |
|---|---|---|---|---|---|
| 5,078,242 | A | | 1/1992 | Ratke et al. | |
| 5,179,868 | A | | 1/1993 | Thibeault | |
| 6,698,555 | B2 | | 3/2004 | Schäfer et al. | |
| 6,701,797 | B2 | | 3/2004 | Heuver | |
| 6,983,668 | B2 | | 1/2006 | Powell et al. | |
| 2004/0011609 | A1 | | 1/2004 | Schmid | |

FOREIGN PATENT DOCUMENTS

| JP | 61253224 | 11/1986 |
|---|---|---|
| JP | 01199035 | 8/1989 |

* cited by examiner

*Primary Examiner* — Raymond Addie

(57) ABSTRACT

A Park inhibition solenoid assembly for preventing the undesirable shifting of a transmission from an out-of-Park mode to a Park mode includes a follower and an armature slidably disposed within a valve body/housing and within a solenoid. The follower is moveable between an out-of-Park position and a Park position and the armature is moveable between an unlocked position and a locked position. The follower and armature include detents for supporting a bearing. The armature and bearing prevent the follower from moving from the out-of-Park position to the Park position when the armature is held in place in the lock position by the solenoid.

19 Claims, 3 Drawing Sheets

PARK INHIBITION SOLENOID ASSEMBLY

CROSS-REFERENCE TO RELATED APPLICATIONS

This application claims the benefit of U.S. Provisional Application No. 61/015,690, filed on Dec. 21, 2007. The disclosure of the above application is incorporated herein by reference.

FIELD

The invention relates generally to a park inhibition solenoid assembly for a motor vehicle, and more particularly to a park inhibition solenoid assembly having a locking collar to prevent a motor vehicle from shifting into a Park mode.

BACKGROUND

The statements in this section merely provide background information related to the present disclosure and may or may not constitute prior art.

A typical multiple speed transmission uses a combination of torque transmitting devices and gear sets to achieve a plurality of driving modes that include a plurality of out-of-Park driving modes and a Park mode. The out-of-Park driving modes generally include forward gear or speed ratios (i.e. a Drive mode), at least one reverse gear or speed ratio (i.e. a Reverse mode), and a Neutral mode. Selection of the various driving modes is typically accomplished by engaging a shift lever or other driver interface device that is connected by a shifting cable or other mechanical connection to the transmission. Alternatively, the selection of a driving mode may be controlled by an electronic transmission range selection (ETRS) system, also known as a "shift by wire" system. In an ETRS system, selection of the driving modes is accomplished through electronic signals communicated between the driver interface device and the transmission. The ETRS system reduces mechanical components, increases instrument panel space, enhances styling options, and eliminates the possibility of shifting cable misalignment with transmission range selection levers.

The ETRS system includes various components to engage the out-of-Park mode and Park mode, including a Park inhibition solenoid. The Park inhibition solenoid is operable to prevent the transmission from undesirably shifting from the out-of-Park mode to the Park mode. While typical Park inhibition solenoids are useful for their intended purpose, the employment of ETRS systems within applications having heavier fluid pressures and forces, such as trucks and sport utility vehicles, requires an increased ability to prevent undesirable engagement of the Park mode. Accordingly, there is room in the art for a Park inhibition solenoid assembly having locking features to prevent undesirable engagement of the Park mode while minimizing the size and weight of the solenoid.

SUMMARY

The present invention provides a Park inhibition solenoid assembly for preventing the undesirable shifting of a transmission from an out-of-Park mode to a Park mode. The Park inhibition solenoid assembly includes a follower and an armature slidably disposed within a valve body or housing and within a solenoid. The follower is moveable between an out-of-Park position and a Park position and the armature is moveable between an unlocked position and a locked position. The follower and armature include detents for supporting a bearing or series of bearings about the circumference. The armature and bearing prevent the follower from moving from the out-of-Park position to the Park position when the armature is held in place in the locked position by the solenoid.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
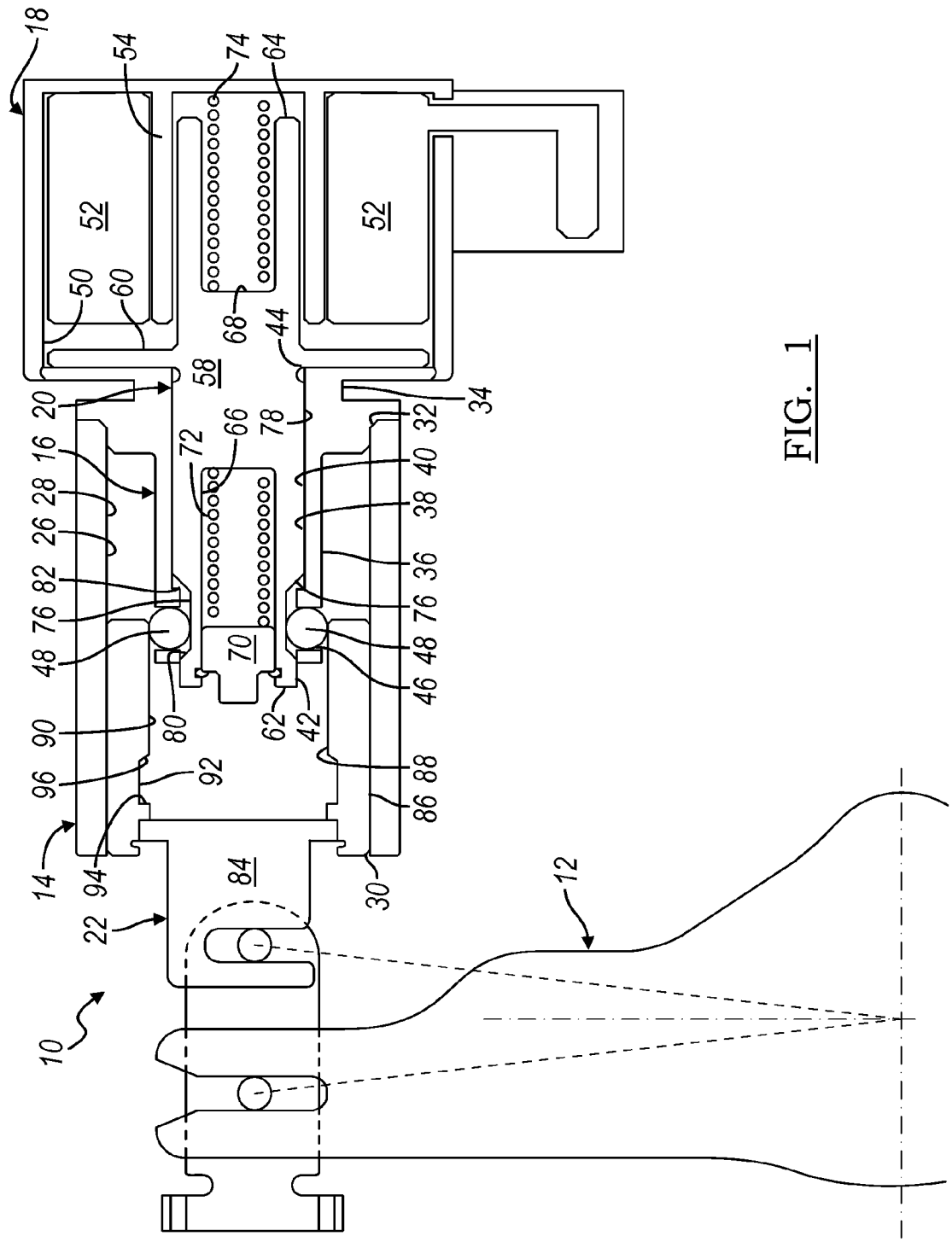
FIG. 1 is a schematic cross-sectional diagram of an embodiment of a Park inhibition solenoid assembly in a Park position according to the principles of the present invention.

With reference to FIG. 1, a Park inhibition solenoid assembly for use in a motor vehicle is generally indicated by reference number 10. The Park inhibition solenoid assembly 10 is preferably employed in an electronic range selection (ETRS) system in a transmission. An exemplary ETRS system for use with the present invention is disclosed in commonly assigned U.S. Pat. No. 6,983,668, hereby incorporated by reference as if fully disclosed herein. This design is an extension of that invention to handle applications with new fluid pressures and forces. The ETRS system generally includes a plurality of servos, solenoids, valves, and a detent lever. An exemplary detent lever for use with the Park inhibition solenoid assembly 10 is generally indicated by reference number 12. The components of the ETRS system, including the detent lever 12, cooperate to shift the transmission between an out-of-Park mode that preferably includes a Neutral, forward, and reverse speed ratios and a Park mode. The Park mode is intended to prevent movement of the motor vehicle. The Park inhibition solenoid assembly 10 is operable to prevent the detent lever 12 from undesirably or unintentionally shifting between the out-of-Park mode and the Park mode, as will be described in greater detail below.

The Park inhibition solenoid assembly 10 includes a valve body or housing 14, an inner sleeve 16, a solenoid body 18, an armature 20, and a follower or outer sleeve 22. The valve body/housing 14 is generally cylindrical in shape and includes a bore surface 26 that defines a valve bore 28. The valve body/housing 14 further includes a first open end 30 that communicates with the valve bore 28 and a second open end 32 that communicates with the valve bore 28 opposite the first open end 30.

The inner sleeve 16 includes a body portion 34 and a sleeve extension 36 that extends axially from the body portion 34. The inner sleeve 16 also includes an inner sleeve surface 38 that defines a bore 40. The bore 40 extends through the sleeve extension 36 and the body portion 34. A first opening 42 is located on an end of the sleeve extension 36 and communicates with the bore 40 and a second opening 44 is located on an end of the body portion 34 and communicates with the bore 40. The sleeve extension 36 includes a plurality of holes 46 that extend through the sleeve extension 36 and communicate with the bore 40. A plurality of bearings 48 are located within the holes 46. The bearings 48 are preferably ball bearings, though other types of bearings may be employed without departing from the scope of the present invention. Additionally, while only two bearings 48 are illustrated throughout the several views, it should be appreciated that any number of bearings 48 may be employed without departing from the scope of the present invention. The inner sleeve 16 is attached or otherwise coupled to the valve body/housing 14 such that the inner sleeve 16 and the valve body/housing 14 are coaxial. More specifically, the sleeve extension 36 extends into the valve bore 28 of the valve body/housing 14 and the body portion 34 is at least partially located within the second opening 32 of the valve body/housing 14.

The solenoid body 18 is attached or otherwise coupled to the body portion 34 of the inner sleeve 16. The solenoid body 18 and the body portion 34 cooperate to define a central cavity 50 within the solenoid body 18. A solenoid coil 52 is located within the central cavity 50. The solenoid coil 52 is selectively energizeable to produce a magnetic force, as is known in the art. The solenoid coil 52 is supported within the cavity 50 by a hollow cylindrical shaft 54 coupled at an end thereof to the solenoid body 18. The hollow cylindrical shaft 54 is preferably coaxial with the valve body/housing 14 and the inner sleeve 16.

The armature 20 includes a longitudinal body 58 and an arm 60. The arm 60 extends radially from the body 58 and is located between a first end 62 of the body 58 and a second end 64 of the body 58. The first end 62 includes a first aperture 66 that is coaxial with and extends into the body 58. A tolerance piston 70 is slidably disposed within the first aperture 66. A tolerance spring 72 is located within the first aperture 66 between the body 58 and the tolerance piston 70. While the tolerance spring 72 is illustrated as a coiled spring in the present embodiment, it should be appreciated that any kind of biasing member may be employed without departing from the scope of the present invention. The tolerance spring 72 and tolerance piston 70 cooperate to account for axial misalignment of the Park inhibition solenoid assembly 10 with respect to the detent lever 12, as will be described in greater detail below. The second end 64 includes a second aperture 68 that is coaxial with and extends into the body 58. An armature spring 74 is at least partially located within the second aperture 68. While the armature spring 74 is illustrated as a coiled spring in the present embodiment, it should be appreciated that any kind of biasing member may be employed without departing from the scope of the present invention. The armature spring 74 engages the solenoid body 18, as will be described in greater detail below. The armature spring 74 preferably has a stiffness less than that of the tolerance spring 72.

Figure 3:
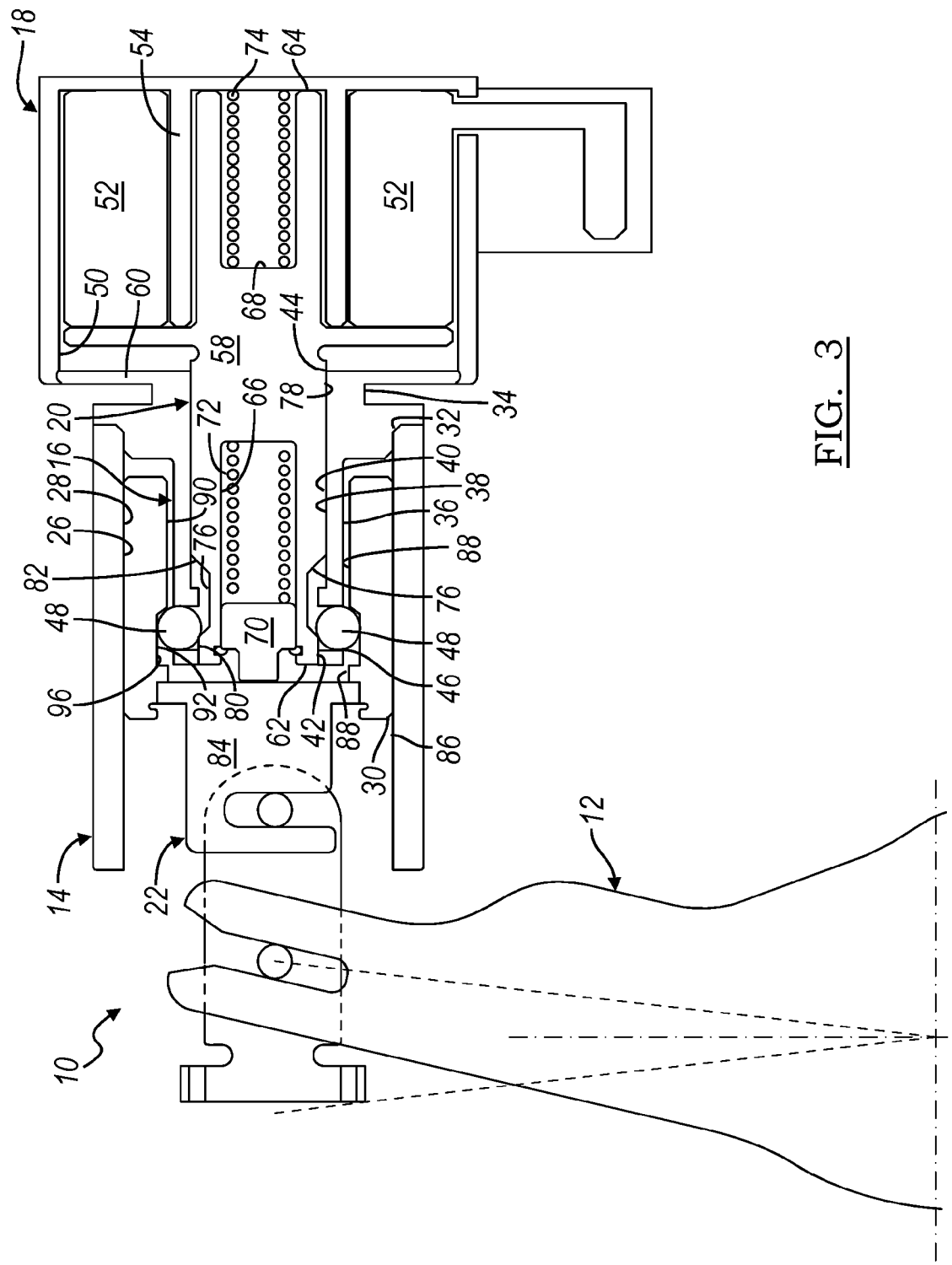
FIG. 3 is a schematic cross-sectional diagram of an embodiment of a Park inhibition solenoid assembly in an out-of-Park position according to the principles of the present invention.

The armature 20 also includes a detent 76 located on an outer surface 78 of the body 58 proximate to the first end 62. The detent 76 includes an angled front face 80 and an angled back face 82. The detent 76 is sized to accommodate the bearing 46, as will be described in greater detail below. The detent 76 may be a single circumferential groove that extends along the entire circumference of the body 58 or a plurality of discrete detents without departing from the scope of the present invention. The armature 20 is slidably disposed within the bore 40 of the inner sleeve 16 such that the first end 62 extends from the first opening 42 of the inner sleeve 16 and is slidably disposed within the shaft 54 of the solenoid body 18 such that the second end 64 is located within the shaft 54 and the arm 60 extends into the cavity 50. The armature 20 is moveable relative to the valve body/housing 14, the inner sleeve 16, and the solenoid body 18 between a first or unlocked position, as illustrated in FIG. 1, and a second or locked position, as illustrated in FIG. 3. The armature spring 74 is operable to bias the armature 20 to the unlocked position.

The follower 22 includes a head portion 84 and a collar 86. The head portion 84 is coupled or otherwise attached to the detent lever 12. The collar 86 extends longitudinally from the head portion 84 and includes an inner surface 88. The inner surface 88 defines a bore 90. The follower 22 further includes a detent 92 located on the inner surface 88 proximate to the head portion 84. The detent 92 includes a front face 94 and an angled back face 96. The detent 92 may be a single circumferential groove extending around the inner circumference of the collar 86 or a plurality of discrete detents without departing from the scope of the present invention. The follower 22 is slidably disposed within the valve bore 28 of the valve body/housing 14. More specifically, the head portion 84 extends out from the first open end 30 of the valve body/housing 14 and the collar 86 extends into the valve bore 28 between the valve body/housing 14 and the sleeve extension 36 of the inner sleeve 16. The follower 22 is moveable relative to the valve body/housing 14, the inner sleeve 16, and the solenoid body 18 between a Park position, as illustrated in FIG. 1, and an out-of-Park position, as illustrated in FIG. 3. The Park position and out-of-Park position of the follower 22 correlate to the Park and out-of-Park positions of the detent lever 12.

During operation, the detent lever 12 is moved by the ETRS system between the Park position and the out-of-Park position and the Park inhibition solenoid assembly 10 is operable to selectively lock the detent lever 12 in the out-of-Park position. For example, when the ETRS system is in the Park mode, the detent lever 12 is positioned as shown in FIG. 1. The detent lever 12 in turn positions the follower 22 into the Park position such that the follower 22 does not engage the armature 20. Accordingly, the armature 20 is biased by the armature spring 74 into the unlocked position. Accordingly, the Park inhibit solenoid assembly 10 does not inhibit the movement of the follower 22 and the detent lever 12 when the detent lever 12 and follower 22 are in the Park position.

Figure 2:
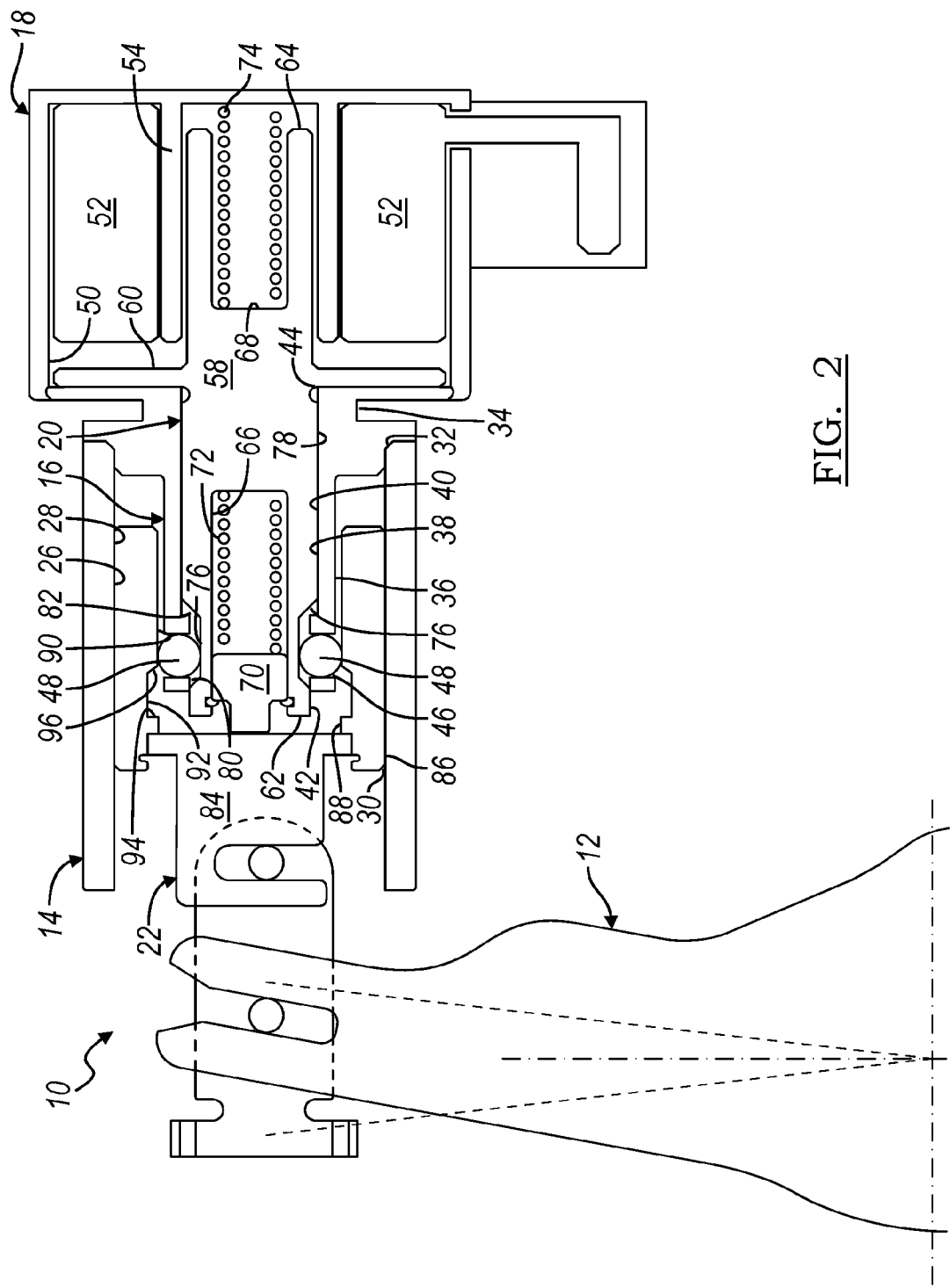
FIG. 2 is a schematic cross-sectional diagram of an embodiment of a Park inhibition solenoid assembly in a transitional position according to the principles of the present invention.

When the ETRS system engages the out-of-Park mode, the detent lever 12 begins to move the follower 22 to the out-of-Park position, as shown in FIG. 2. As the follower 22 moves to the out-of-Park position, the collar 86 slides along the bearings 48 between the valve body/housing 14 and the inner sleeve 16 and the head portion 84 engages the tolerance piston 70. During the movement of the follower 22 from the Park position to the out-of-Park position, the bearings 48 are depressed into the detents 76 located in the armature 20. As the head portion 84 engages the tolerance piston 70, the tolerance piston 70 attempts to compresses the tolerance spring 72. However, the stiffness of the tolerance spring 72 is greater than that of the armature spring 74 and accordingly as the follower 22 moves to the out-of-Park position, the head portion urges the armature 20 to the locked position by compressing the armature spring 74.

When the detent lever 12 and follower 22 reach the out-of-Park position, as shown in FIG. 3, the armature 20 is positioned into the locked position such that the arm 60 abuts the solenoid coil 52. Additionally, the bearings 48 are moved into the detent 92 on the follower 22 by the angled front face 80 of the detent 76 of the armature 20 as the armature 20 moves to the locked position.

When the ETRS system reengages the Park mode, the detent lever 12 moves back to the Park position. Accordingly, the detent lever 12 moves the follower 22 back to the Park position and the armature spring 74 urges the armature 20 back to the unlocked position. The angled back face 96 of the detent 92 engages the bearings 48, and the bearings 48 in turn are moved downward into the detents 76 on the armature 20.

However, in the event that the detent lever 12 attempts to move to the Park position when not commanded to by an operator of the motor vehicle or during any other preselected condition, the solenoid coil 52 is energized such that the arm 60 is magnetically drawn towards the solenoid coil 52 and therefore the armature 20 is held in place in the locked position. Accordingly, as the follower 22 is moved to the Park position by the detent lever 12, the bearings 48 engage the angled back face 96 of the detent 92. However, the bearings 48 are not urged into the detents 76 of the armature 20 since the armature 20 is locked from moving. Accordingly, the follower 22 is prevented from moving to the Park position by the bearings 48, and accordingly the detent lever 12 is prevented from reaching the Park position. In this way, the Park inhibition solenoid assembly 10 is operable to selectively inhibit the movement of the detent lever 12 to the Park position during preselected conditions.

The description of the invention is merely exemplary in nature and variations that do not depart from the gist of the invention are intended to be within the scope of the invention. Such variations are not to be regarded as a departure from the spirit and scope of the invention.

We claim the following:

1. An assembly disposed within a transmission for controlling the movement of a lever between a first position and a second position, the first position corresponding to a first mode of transmission operation and the second position corresponding to a second mode of transmission operation, the assembly comprising:
   a housing having a longitudinal axis;
   an inner sleeve attached to and disposed within the housing, wherein the inner sleeve is coaxial with the longitudinal axis, and wherein the inner sleeve defines an aperture that extends from an inner surface of the inner sleeve to an outer surface of the inner sleeve;
   a bearing element disposed within the aperture of the inner sleeve;
   an outer sleeve connected to and moveable by the lever, the outer sleeve disposed between the inner sleeve and the housing, the outer sleeve coaxial with the longitudinal axis, the outer sleeve having an inner surface that defines a detent, and wherein the bearing element is aligned with the detent of the outer sleeve when the lever is in the second position; and
   an armature slidably disposed within the inner sleeve and coaxial with the longitudinal axis, the armature having an outer surface that defines a detent, wherein the armature is moveable along the longitudinal axis between an unlocked position and a locked position, and wherein the bearing element is aligned with the detent of the armature when the armature is in the unlocked position and the bearing element is not aligned with the detent of the armature when the armature is in the locked position, and
   wherein the lever is prevented from moving from the second position to the first position when the armature is in the locked position and the bearing element prevents the outer sleeve from moving relative to the inner sleeve.

2. The assembly of claim 1 further comprising a solenoid proximate the armature, wherein the solenoid is operable to move the armature to the second position when the solenoid is activated.

3. The assembly of claim 1 wherein the detent of the outer sleeve includes a front face and a back face, wherein the back face is substantially perpendicular to the axis to prevent the bearing element from moving out of the detent and the front face is substantially angled with respect to the axis to allow the bearing element to move out of the detent.

4. The assembly of claim 3 wherein the detent of the armature includes a front face and a back face, wherein the front and back faces are substantially angled with respect to the axis to allow the bearing element to move out of the detent of the armature.

5. The assembly of claim 1 wherein the detent of the armature is disposed proximate a distal end of the armature that is disposed within the outer sleeve.

6. The assembly of claim 1 wherein the armature includes an opening disposed in a distal end of the armature, and the assembly further comprises a piston at least partially located within the opening and a biasing member located within the opening between the piston and the armature, wherein the piston is contacted by the outer sleeve when the lever moves to the second position.

7. The assembly of claim 1 wherein the bearing element is restricted by the inner sleeve from moving in a direction along the longitudinal axis and is allowed to move radially with respect to the inner sleeve within the aperture.

8. The assembly of claim 1 wherein the bearing element is a ball bearing operable to roll with respect to the inner sleeve.

9. The assembly of claim 1 further comprising a biasing member located between the armature and the housing, wherein the biasing member is operable to bias the armature to the unlocked position.

10. An assembly disposed within a transmission for controlling the movement of a lever between a first position and a second position, the first position corresponding to a Park mode of transmission operation and the second position corresponding to an out-of-Park mode of transmission operation, the assembly comprising:
   a housing having a longitudinal axis;
   an inner sleeve attached to and disposed within the housing, wherein the inner sleeve is coaxial with the longitudinal axis, and wherein the inner sleeve defines an aperture that extends from an inner surface of the inner sleeve to an outer surface of the inner sleeve;
   a bearing element disposed within the aperture of the inner sleeve;
   an outer sleeve connected to and moveable by the lever, the outer sleeve disposed between the inner sleeve and the housing, the outer sleeve coaxial with the longitudinal axis, the outer sleeve having an inner surface that defines a detent, and wherein the bearing element is aligned with the detent of the outer sleeve when the lever is in the second position; and
   an armature slidably disposed within the inner sleeve and coaxial with the longitudinal axis, the armature having an outer surface that defines a detent, wherein the armature is moveable along the longitudinal axis between an unlocked position and a locked position, and wherein the bearing element is aligned with the detent of the armature when the armature is in the unlocked position and the bearing element is not aligned with the detent of the armature when the armature is in the locked position, a solenoid coupled to the housing proximate the armature, the solenoid having a coil operable to move the armature to the locked position when the solenoid is activated, and wherein the lever is prevented from moving from the second position to the first position when the armature is in the locked position and the bearing element prevents the outer sleeve from moving relative to the inner sleeve.

11. The assembly of claim 10 wherein the solenoid moves the armature to the second position when the coil is energized, thereby creating a magnetic force that moves the armature towards the coil.

12. The assembly of claim 10 wherein the detent of the outer sleeve includes a front face and a back face, wherein the back face is substantially perpendicular to the axis to prevent the bearing element from moving out of the detent and the front face is substantially angled with respect to the axis to allow the bearing element to move out of the detent.

13. The assembly of claim 12 wherein the detent of the armature includes a front face and a back face, wherein the front and back faces are substantially angled with respect to the axis to allow the bearing element to move out of the detent of the armature.

14. The assembly of claim 10 wherein the armature includes a first end opposite a second end, and the detent of the armature is disposed proximate the first end of the armature, wherein the first end is disposed within the outer sleeve and the second end is disposed within the solenoid.

15. The assembly of claim 14 wherein the armature includes an opening disposed in the first end of the armature, and the assembly further comprises a piston and a first biasing member, wherein the piston is at least partially located within the opening and the first biasing member is located within the opening between the piston and the armature, wherein the piston is contacted by the outer sleeve when the lever moves to the second position.

16. The assembly of claim 15 wherein the armature includes an opening located within the second end, and the assembly further comprises a second biasing member located within the opening in the second end of the armature, wherein the second biasing member contacts the armature and the housing, and wherein the second biasing member is operable to bias the armature to the unlocked position.

17. The assembly of claim 10 wherein the bearing element is restricted by the inner sleeve from moving in a direction along the longitudinal axis and is allowed to move radially with respect to the inner sleeve within the aperture.

18. The assembly of claim 10 wherein the bearing element is a ball bearing operable to roll with respect to the inner sleeve.

19. The assembly of claim 10 wherein the outer surface of the armature is at least partially opposed to the inner surface of the inner sleeve and wherein the outer surface of the inner sleeve is at least partially opposed to the inner surface of the outer sleeve.

* * * * *